US011994819B2

(12) United States Patent
Mogi et al.

(10) Patent No.: US 11,994,819 B2
(45) Date of Patent: May 28, 2024

(54) IMAGE FORMING APPARATUS

(71) Applicant: CANON KABUSHIKI KAISHA, Tokyo (JP)

(72) Inventors: Keisuke Mogi, Chiba (JP); Hisashi Tsukijima, Ibaraki (JP); Yoshiya Numata, Ibaraki (JP); Masaki Maeno, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/190,688

(22) Filed: Mar. 27, 2023

(65) Prior Publication Data

US 2023/0236535 A1 Jul. 27, 2023

Related U.S. Application Data

(63) Continuation of application No. PCT/JP2021/038617, filed on Oct. 19, 2021.

(30) Foreign Application Priority Data

Oct. 28, 2020 (JP) ................................ 2020-180801

(51) Int. Cl.
*G03G 15/16* (2006.01)
*G03G 15/00* (2006.01)

(52) U.S. Cl.
CPC ..... *G03G 15/5054* (2013.01); *G03G 15/1615* (2013.01)

(58) Field of Classification Search
CPC ...................... G03G 15/1615; G03G 15/5054
USPC ..................................................... 399/38, 66
See application file for complete search history.

(56) References Cited

U.S. PATENT DOCUMENTS

2018/0253023 A1* 9/2018 Imai .................... G03G 15/502

FOREIGN PATENT DOCUMENTS

JP 2005215340 A 8/2005
JP 2010160203 A 7/2010
JP 2017072689 * 4/2017
JP 2018200396 A 12/2018

* cited by examiner

*Primary Examiner* — Hoan H Tran
(74) *Attorney, Agent, or Firm* — Canon U.S.A., Inc. I.P. Division

(57) ABSTRACT

The image forming apparatus forms a test chart on an image bearing member, the test chart including a plurality of test images including a first test image of a first density and a second test image formed at a position different from a position of the first test image in a conveying direction of a recording medium, the second test image having a second density different from the first density. The image forming apparatus transfers the test chart to the recording medium with a transfer roller and controls the rotation velocity of the transfer roller when the recording medium passes through a transfer portion based on a result of reading the test chart on the recording medium with a reading unit.

6 Claims, 11 Drawing Sheets

| SHEET FEEDING MODE | SIDE OF SHEET | ← LEADING END OF SHEET — COVERAGE — TRAILING END OF SHEET → | | | |
|---|---|---|---|---|---|
| FIRST-SIDE FEEDING | ADJACENT TO SECONDARY-TRANSFER BELT | 0 | 50 | 100 | 200 |
| | ADJACENT TO SECONDARY-TRANSFER OUTER ROLLER | 0 | 0 | 0 | 0 |
| SECOND-SIDE FEEDING | ADJACENT TO SECONDARY-TRANSFER BELT | 0 | 50 | 100 | 200 |
| | ADJACENT TO SECONDARY-TRANSFER OUTER ROLLER | 200 | 100 | 50 | 0 |

IMAGE FORMING APPARATUS

CROSS-REFERENCE TO RELATED APPLICATIONS

This application is a Continuation of International Patent Application No. PCT/JP2021/038617, filed Oct. 19, 2021, which claims the benefit of Japanese Patent Application No. 2020-180801, filed Oct. 28, 2020, both of which are hereby incorporated by reference herein in their entirety.

TECHNICAL FIELD

The present invention relates to a technique for correcting magnification in a sub-scanning direction.

BACKGROUND ART

Electrophotographic image forming apparatuses generally adopt a process for fixing toner images to sheets through the processes of charging, exposing, developing, transferring, and fixing.

Image forming apparatuses using an intermediate transfer method adopt an image forming process of primarily transferring toner images formed in an image forming unit to an intermediate transfer belt and then secondarily transferring the toner images formed on the intermediate transfer belt onto sheets, such as paper media, fed or conveyed thereto.

The secondary transfer is performed at a secondary transfer nip formed by pushing a secondary transfer member (a secondary-transfer inner roller) that stretches the back of the intermediate transfer belt with a roller (a secondary-transfer outer roller) facing the secondary transfer member from the front of the intermediate transfer belt.

Here, since the shape of the secondary transfer nip (secondary transfer nip portion) varies according to the fed sheet, it is known that various problems occur in secondary transfer according to the conditions of the sheet (for example, stiffness, basis weight, and surface characteristics).

For example, when sheets of different thicknesses, such as thin paper and thick paper, are fed, or when sheets with different surface characteristics, such as fine paper and glossy paper, are fed, the conveying force of the intermediate transfer belt applied to the sheets changes, and as a consequence, the sheet conveying velocity changes.

Also when toner is present between the intermediate transfer belt and the sheet at the secondary transfer nip, the intermediate transfer belt applies a conveying force to the sheet via the toner, and as a consequence, the conveying velocity changes.

Also for a surface of the sheet adjacent to the secondary-transfer outer roller (that is, the second side in duplex printing), the sheet conveying velocity changes according to whether a toner layer subjected to a fixing process is present on the surface of the sheet. In particular, when the secondary-transfer outer roller is driven, the difference causes a problem.

The change in the sheet conveying velocity, described above, appears, if it appears in the surface of the sheet), as partial expansion and contraction of images (partial magnification change) in the sheet conveying direction (an image sub-scanning direction), and if it appears across the sheet surface, as total expansion and contraction of images (total magnification change) in the sub-scanning direction.

To solve the above problems and satisfy the requirements for high quality images for diversified sheets in the recent commercial printing market, PTL 1 discloses a technique for preventing a magnification change by detecting the linear velocity of an intermediate transfer belt and a paper conveying velocity downstream of a transfer portion and controlling the velocity of the secondary transfer roller on the basis of the detection results.

CITATION LIST

Patent Literature

PTL 1 Japanese Patent Laid-Open No. 2018-200396

The above invention claims to be able to control the total magnification change even if the sheet thickness changes by calculating the average velocity in the sheet surface using a sensor for measuring the sheet velocity, provided downstream from the transfer nip, and determining the conveying velocity of the secondary-transfer outer drive roller.

However, since this configuration adopts a method of calculating the average velocity of one sheet, it cannot follow a partial magnification change in a sheet surface. This can cause a partial magnification change in a sheet surface in printing images of significantly different toner bearings in a sheet surface.

SUMMARY OF INVENTION

Accordingly, an object of the present invention is to correct the partial magnification of images formed on a sheet with high accuracy.

To achieve the above object, an image forming apparatus according to an aspect of the present invention includes an image forming unit configured to form a toner image on an image bearing member, a rotatable transfer member that forms a transfer portion with the image bearing member, the transfer member being configured to transfer the toner image on the image bearing member to a recording medium, a driving source configured to drive the transfer member, a control unit configured to control a rotation velocity of the transfer member rotated by the driving source, and a reading unit configured to read the image formed on the recording medium, wherein the control unit is capable of making the image forming unit form a test chart including a plurality of test images including a first test image of a first density and a second test image formed at a position different from a position of the first test image in a conveying direction of the recording medium, the second test image having a second density different from the first density, making the transfer member transfer the test chart from the image bearing member to the recording material, and outputting the test chart, and wherein the control unit is configured to control the rotation velocity of the transfer member at transfer based on a result of reading the test chart transferred to the recording medium with the reading unit.

The present invention allows the partial magnification of images formed on a sheet to be corrected with high accuracy.

Further features of the present invention will become apparent from the following description of exemplary embodiments with reference to the attached drawings.

DESCRIPTION OF EMBODIMENTS

An image forming apparatus according to an embodiment of the present invention will be described hereinbelow with reference to the drawings. The following is an example in which the present invention is applied to an electrophotographic full-color image forming apparatus including a plurality of photosensitive drums. However, this is illustrative only, and the present invention can also be applied to various types of image forming apparatus and a single-color image forming apparatus.

The schematic configuration of the image forming apparatus of this embodiment will be first described with reference to FIG. 1.

Figure 1:
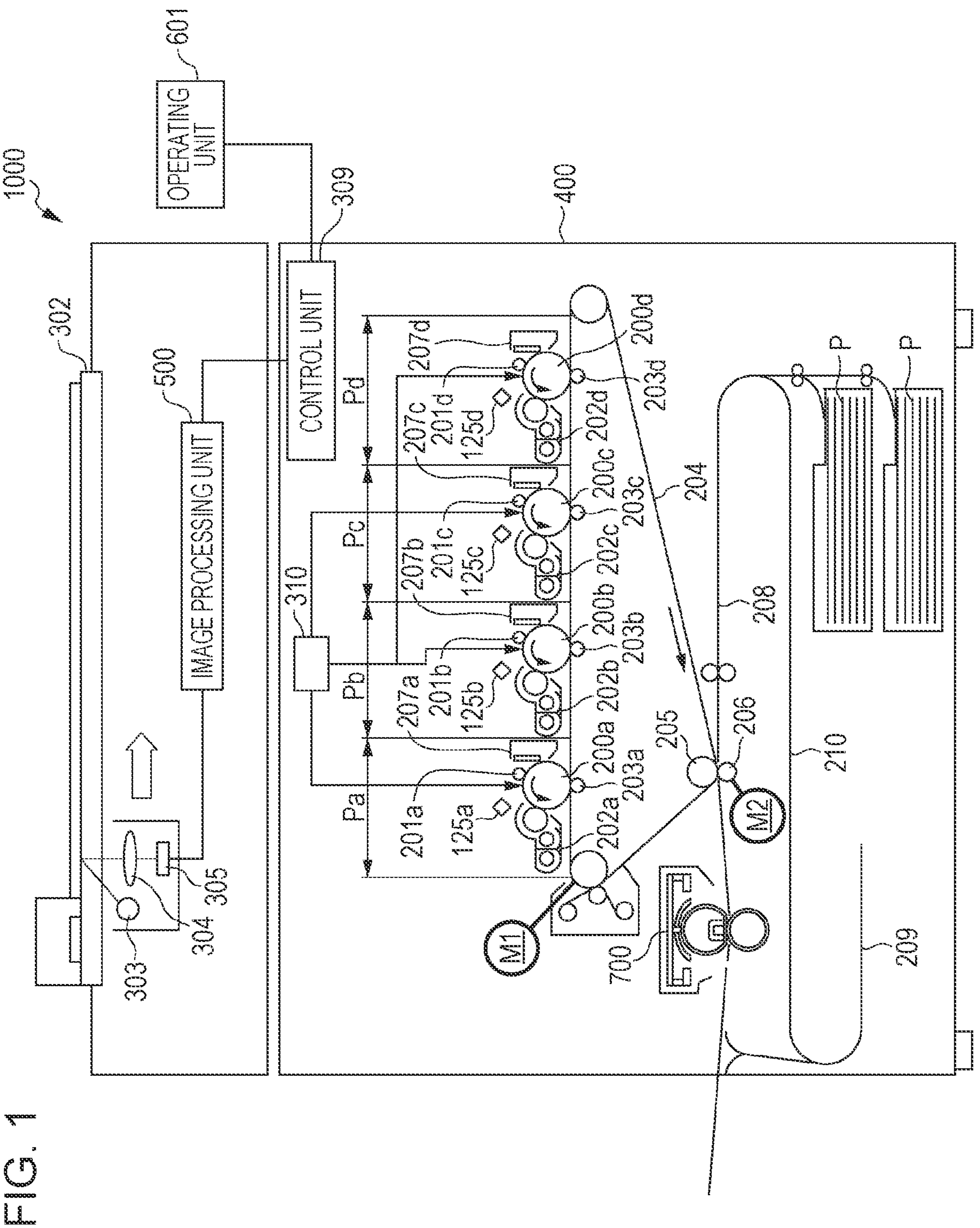
FIG. 1 is a schematic cross-sectional view of an image forming apparatus.

FIG. 1 is a diagram illustrating the full-color image forming apparatus according to this embodiment. In the following description, the longitudinal direction of the image forming apparatus or the components constituting the image forming apparatus is a width direction perpendicular to the recording-medium conveying direction in a recording-medium conveying path plane. The lateral direction is parallel to the recording-medium conveying direction. The front is the surface of the apparatus viewed from a recording medium inlet, the back is the opposite side thereof (adjacent to the recording medium outlet), and the right and left are the right and left of the apparatus as viewed from the front, respectively. The upstream side and the downstream side are upstream and downstream in the recording-medium conveying direction, respectively.

An image forming apparatus 1000 includes an image reading unit 300 and an image forming apparatus main body 400. The image reading unit 300 reads an original placed on a platen glass 302, in which the light emitted from a light source 303 is reflected by the original to form an image on a charge-coupled device (CCD) sensor 305 through an optical member 304 such as a lens. Such an optical unit moves in the direction of the arrow to convert the original to an electrical signal data string per line.

The image signals obtained by the CCD sensor 305 are sent to the image forming apparatus main body 400. The image signals are processed by an image processing unit 500 according to each image forming unit. The image processing unit 500 can receive external image signals input from, for example, a print server. The image forming apparatus main body 400 includes a plurality of image forming units Pa, Pb, Pc, and Pd, where images are formed on the basis of the image signals. In other words, the image processing unit 500 transmits image signals to a control unit 309, where the image signals are converted to pulse-width modulated (PWM) laser beams. In FIG. 1, a polygon scanner 310 serving as an exposure device passes laser beams according to the image signals. The laser beams are applied to photosensitive drums 200*a* to 200*d* serving as the respective image bearing members of the image forming units Pa to Pd.

Reference sign Pa denotes a yellow (Y) image forming unit, Pb denotes a magenta (M) image forming unit, Pc denotes a cyan (C) image forming unit, and Pd denotes a black (Bk) image forming unit, which form corresponding color images. Since the image forming units Pa to Pd are substantially the same, the details of the Y image forming unit Pa will be described below, and descriptions of the other image forming units will be omitted. In the Y image forming unit Pa, 200*a* denotes a photosensitive drum, on which a toner image is formed in accordance with the image signal.

Reference sign 201*a* denotes a primary charger, which charges the surface of the photosensitive drum 200*a* to a predetermined potential to prepare to form an electrostatic latent image. The laser beam from the polygon scanner 310 forms an electrostatic latent image on the surface of the photosensitive drum 200*a* charged to the predetermined potential. Reference sign 202*a* denotes a developer, which develops the electrostatic latent image on the photosensitive drum 200*a* to form a toner image. Reference sign 203*a* denotes a transfer roller, which discharges electricity from the back of an intermediate transfer belt 204 serving as an image bearing member to apply a primary transfer bias of a polarity opposite to that of the toner to transfer the toner image on the photosensitive drum 200*a* onto the intermediate transfer belt 204. The surface of the photosensitive drum 200*a* after the transfer is cleaned with a cleaner 207*a*.

The toner image on the intermediate transfer belt 204 is conveyed to the next image forming unit in the order of Y, M, C, and Bk to form a four-color toner image on a surface of the intermediate transfer belt 204. The toner image that has passed through the Bk image forming unit is secondarily transferred to a sheet P from the intermediate transfer belt 204 by receiving a secondary transfer electric field of the same polarity as that of the toner image on the intermediate transfer belt 204 at a secondary transfer portion constituted by a secondary transfer roller pair 205 and 206. A fed sheet P waits at a registration portion 208 and is then conveyed from the registration portion 208 at the timing controlled by a central processing unit (CPU) 600 (see FIG. 8) so as to be aligned with the position of the toner image on the intermediate transfer belt 204. Thereafter, the toner image on the sheet P is fixed in a fixing unit 700 serving as an image heating device.

For a job to print on both sides of the sheet P, after the toner transfer and fixing processes on image-formation first side (the first side) are completed, the sheet P is taken into a reversing portion 209 in the image forming apparatus 1000 after the fixation, where the sheet P stops once and its conveying direction is reversed, so that the leading end and the trailing end of the sheet P are reversed. The sheet P is then reversed inside out through a duplex conveying unit 210, toner transfer and fixing processes on the image-formation second side (the second side) are completed, and the sheet P is discharged out of the image forming apparatus 1000.

Magnification Change in Sub-Scanning Direction

As described above, the partial magnification change and the total magnification change in the sub-scanning direction due to a change in sheet conveying velocity at the secondary transfer nip are caused by differences in the thickness and the surface characteristics of the sheet P and the density of toner on the intermediate transfer belt 204. This is because of a change in sheet velocity due to a change in the conveying force that the sheet P receives from the intermediate transfer belt 204, which causes a change in the difference between the velocity of the intermediate transfer belt 204 (toner image) and the sheet velocity. In the present invention, the sheet velocity is controlled, and the expanding and contracting components of the image itself are out of control, and descriptions thereof will be omitted.

To correct a change in sheet velocity relative to the intermediate transfer belt 204, a drive source M rotates the secondary-transfer outer roller. The velocity of the secondary-transfer outer roller can be changed independently from the velocity of the intermediate transfer belt 204. This allows the sub-scan magnification to be corrected, when the sheet velocity is faster than that of the intermediate transfer belt 204, by decreasing the rotation velocity of the secondary-transfer outer roller, and when the sheet velocity is lower than that of the intermediate transfer belt 204, by increasing the rotation velocity of the secondary-transfer outer roller. Since the image transferred to the sheet P need only have a correct magnification (1.00 times), the circumferential velocity of the intermediate transfer belt 204 and the rotation velocity of the secondary-transfer outer roller are not necessarily set equal.

Correcting Sub-Scan Magnification

Next, correction of partial magnification in the sub-scanning direction in the present invention will be described.

First, the user stores the sheets P to be used in a sheet feeding unit, sets sheet information via an operating unit 601, and presses a velocity-profile obtaining button displayed on the operating unit 601. This causes the control unit 309 of the image forming apparatus 1000 to start to print a test chart for obtaining the velocity profile.

Test Chart

Figure 2:
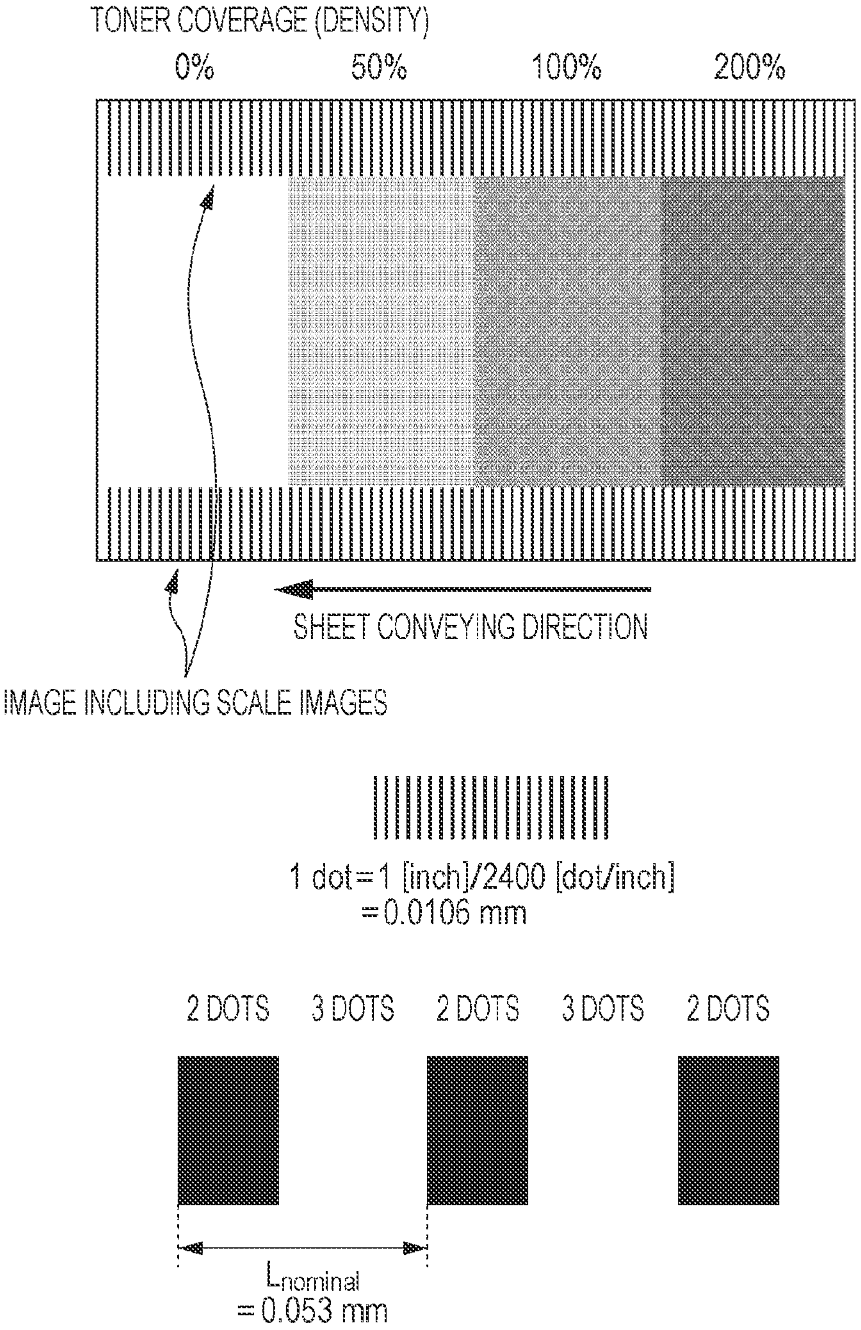
FIG. 2 is a schematic diagram of a test chart.

The test chart has scale images at regular intervals in the conveying direction, as shown in FIG. 2. The test chart is such that the toner born amount is changed in the sheet conveying direction to check the effect of the toner born amount on the magnification in the sub-scanning direction. For example, for an image forming apparatus of a writing resolution of 2,400 dpi, the scale images in the test chart are formed in 2 dots/3 spaces. For this reason, the interval Lnominal between the scale images is 0.053 mm. The test chart is divided into a plurality of areas in the conveying direction in the area other than the opposite ends where the scale images are formed, and the toner density is equal in each of the plurality of areas. The toner born amount on the sheet is 0%, 50%, 100%, 200% from the leading end in the sheet conveying direction. The larger the toner born amount the more the sheet is covered with toner, and the toner coverage is hereinafter referred to as "coverage".

In the test chart, all the positions, the features, the width of the scale images, and the distribution of the coverage in the sheet are selectable.

The images on the first side of the test chart are transferred to the sheet at the transfer portion and are fixed at the fixing unit 700. The test chart is reversed at the reversing portion 209, passes through the duplex conveying unit 210 into the transfer portion and fixing unit 700 again, where the second side is printed, and is discharged out of the image forming apparatus 1000. The scale images are printed to form a test chart in the conveying direction also on the second side, as well as the first side, in which the coverage is distributed in the conveying direction.

Correcting Partial Magnification and Obtaining Velocity Profile

Figure 3:
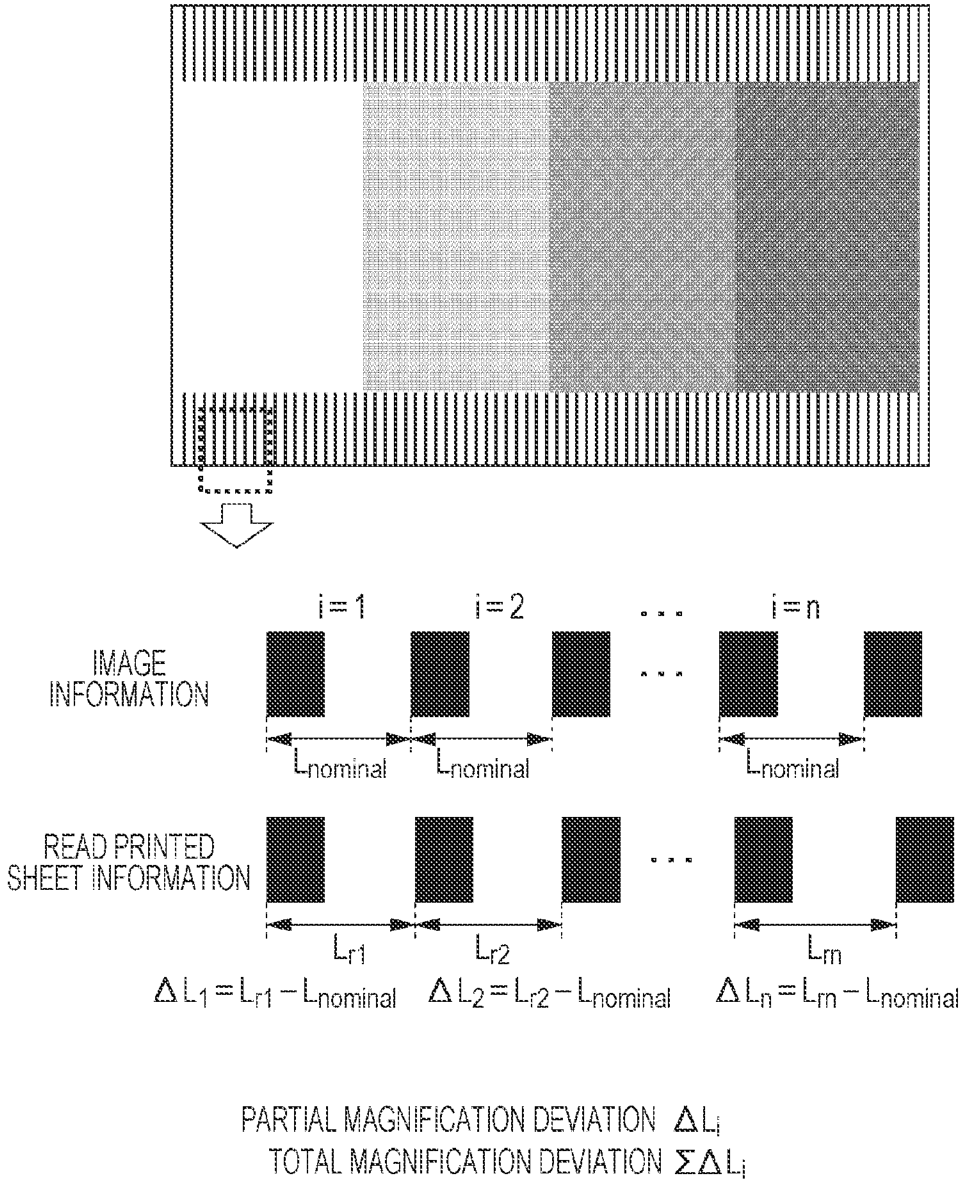
FIG. 3 is a schematic diagram of a test chart.

FIG. 3 is a diagram illustrating calculation of the deviations of the partial magnification and the total magnification from the scale images. When the user prints a test chart on a sheet to be used and scans the printed sheet with the image reading unit 300, the control unit 309 obtains read data on the test chart. The control unit 309 determines the interval Lr between the scale images actually printed on the sheet. The control unit 309 calculates the partial magnifications at individual portions from the difference between the interval Lr and the interval Lnominal between the scale images in the image data. The sum ΣΔLi (i=1 to n) of the differences ΔLi between the interval Lri between the scale images at individual points (i=1 to n) and the interval Lnominal is the total magnification.

$$\text{Partial magnification deviation}\,\Delta Li = Lri - L\text{nominal} \quad \text{Eq. 1}$$

$$\text{Total magnification deviation}\,\Sigma\Delta Li = \Sigma(Lri - L\text{nominal}) = \Sigma Lri - n \times L\text{nominal} \quad \text{Eq. 2}$$

(i=1 to n)

Figure 4:
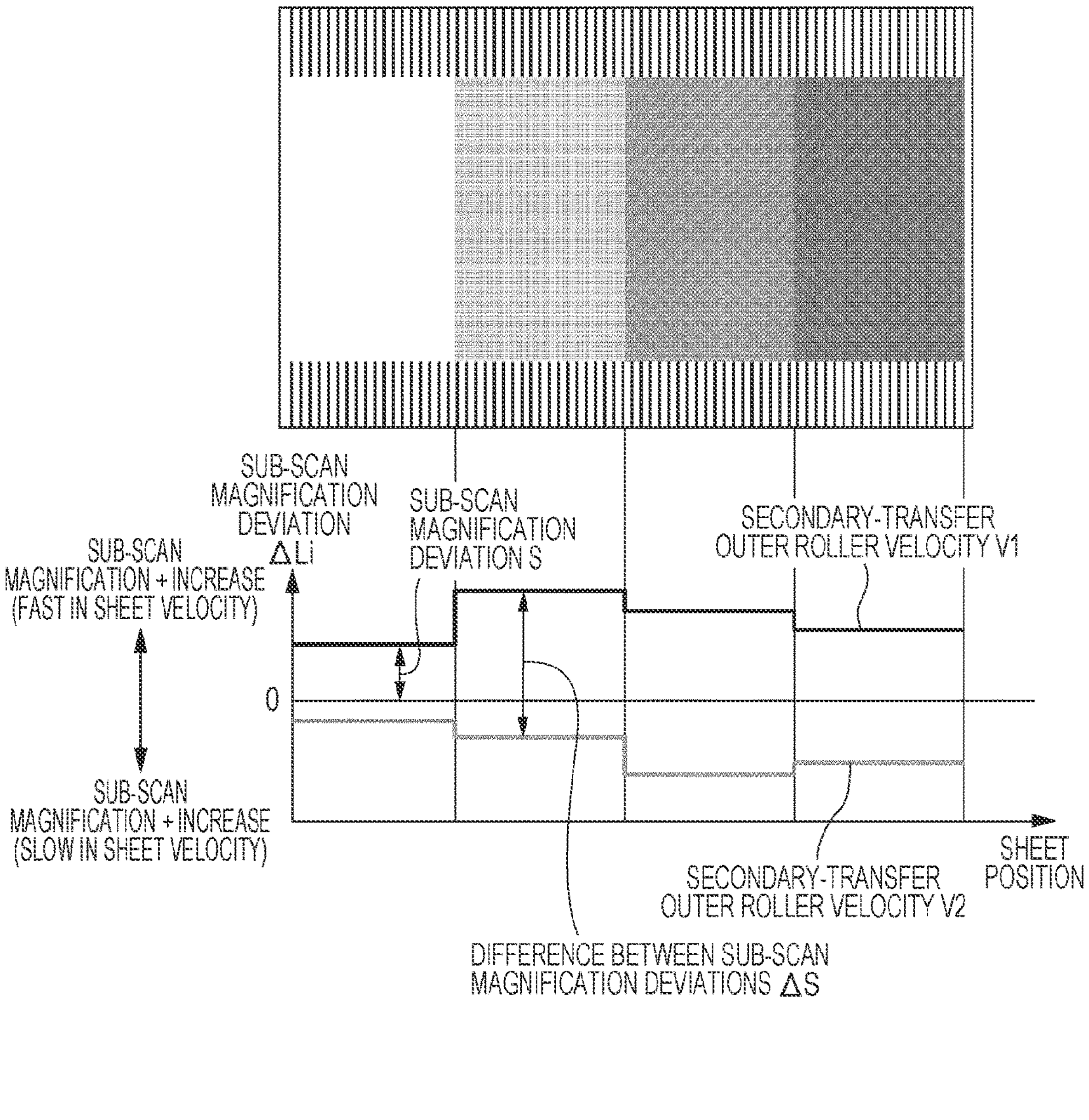
FIG. 4 is a graph showing sub-scan magnification deviation obtained from the test chart.

FIG. 4 is a graph showing the result of numerical processing of the test chart for two velocities V1 and V2 of the secondary-transfer outer roller read for the first side. The vertical axis of the graph indicates the deviation ΔLi of the sub-scan magnification of each portion, and the horizontal axis indicates positions in the test chart. The deviation ΔLi, which varies in the same coverage band according to measurement errors, vibration components of the individual rollers, is a value obtained by averaging the deviations ΔLi in the same toner density area for convenience. In other words, the value of the deviation ΔLi is uniquely determined by numerically processing the deviations ΔLi of the scale images at the individual positions in the same coverage area. This value is used as a sub-scan magnification deviation S. This diagram shows that the sub-scan magnification changes according to the coverage. The deviation of the sub-scan magnification changes also according to the velocities of the secondary-transfer outer roller. The difference between the deviations of sub-scan magnifications according to the two secondary-transfer outer roller velocities V1 and V2 is expressed as ΔS.

Figure 5:
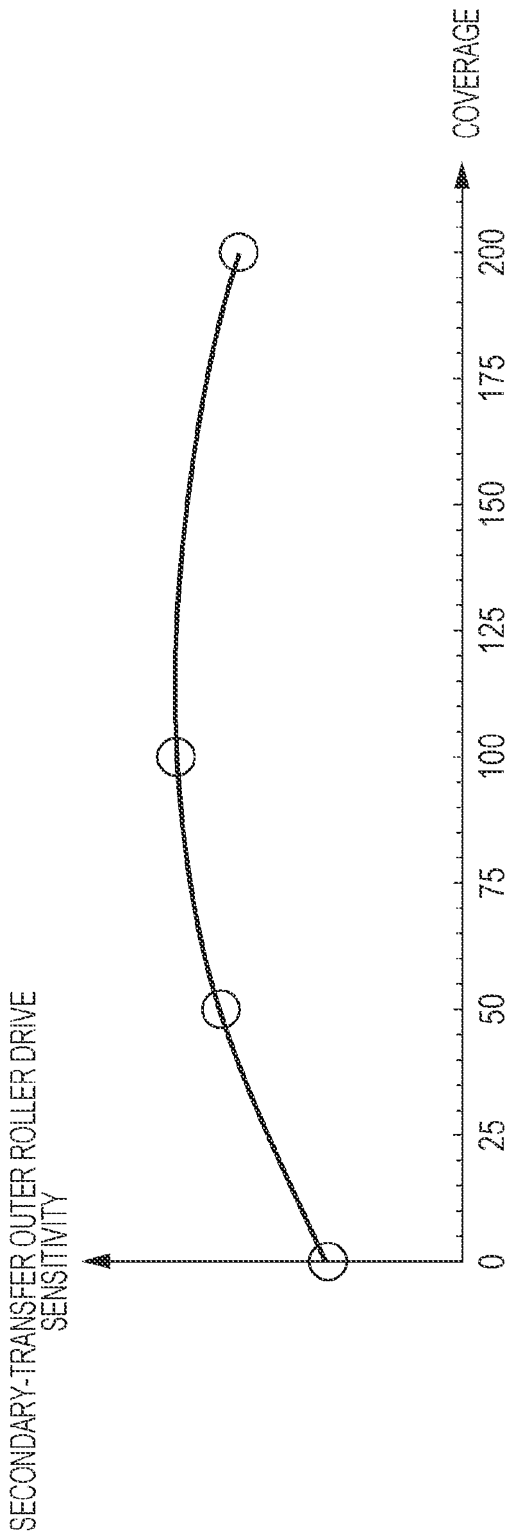
FIG. 5 is a graph showing the velocity sensitivity of a secondary-transfer outer roller.

The reason why the two kinds of velocities V1 and V2 of the secondary-transfer outer roller are obtained is because the slip curve between the secondary-transfer outer roller and the sheet changes according to the velocity of the secondary-transfer outer roller, and the degree of effect of adjustment of the velocity of the secondary-transfer outer roller to make the sheet velocity constant on the actual sheet velocity depends on the degree of change in the secondary-transfer outer roller velocity. Accordingly, the velocity sensitivity is calculated from the deviation amount of the sub-scan magnification at the two velocities V1 and V2 of the secondary-transfer outer roller in the area of the same coverage. FIG. 5 shows the velocity sensitivity of the secondary-transfer outer roller drive. The velocity sensitivity also changes according to the toner coverage.

The difference ΔV between the velocities V1 and V2 is expressed as:

$$\text{Secondary-transfer outer roller driving velocity sensitivity} = \Delta S/\Delta V \quad \text{Eq. 3}$$

Since the coverage in the test chart is distributed, the deviation ΔS is obtained according to the coverage.

Figure 6:
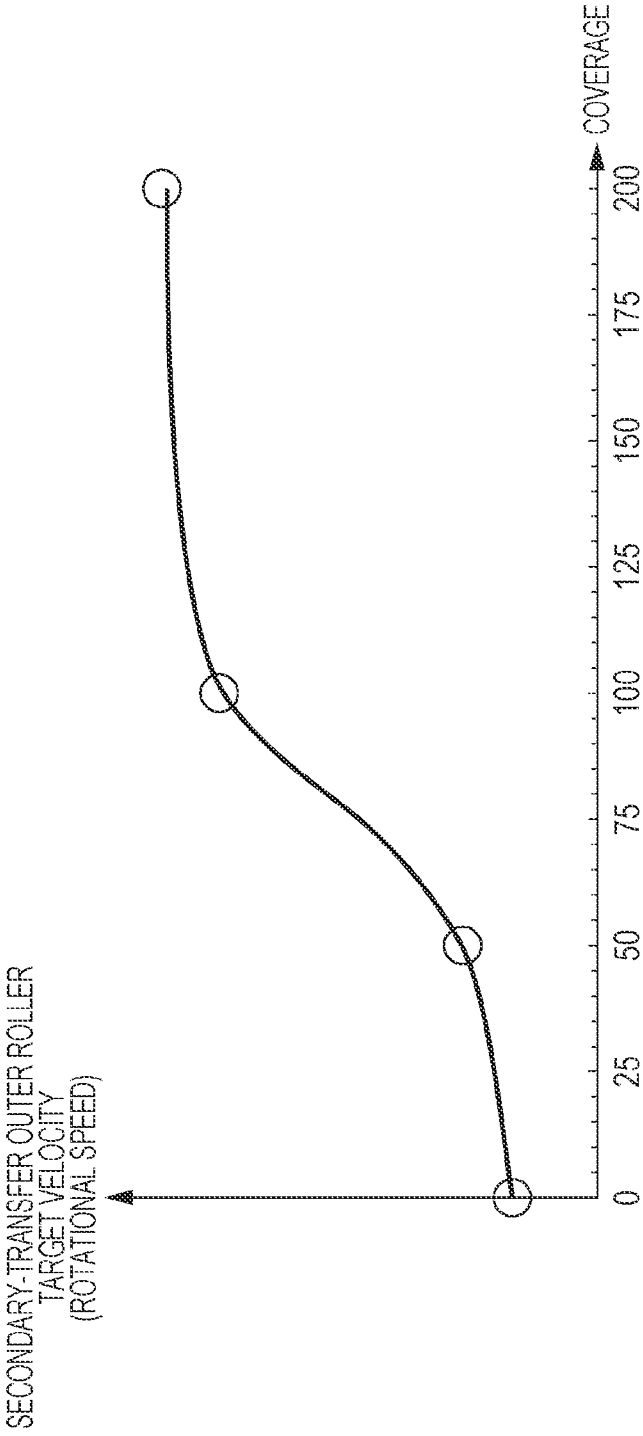
FIG. 6 is a schematic diagram of a velocity profile.

As shown in the velocity profile (FIG. 6), the target velocity of the secondary-transfer outer roller according to the toner coverage is calculated from the deviation of the sub-scan magnification according to the toner coverage and the secondary-transfer outer roller driving velocity sensitivity according to the toner density obtained above. For example, to make the sub-scan magnification deviation zero in the area of a toner density of 50%, the sub-scan magnification is deviated by S(50) at the secondary-transfer outer roller velocity V1. Furthermore, the sub-scan magnification deviates by ΔS(50) at the difference ΔV between the secondary-transfer outer roller velocities V1 and V2. From this, the target velocity V(50) of the secondary-transfer outer roller at a toner density of 50% is expressed as:

$$V(50)=V1-(S(50)/\Delta S(50)\times\Delta V) \quad \text{Eq. 4.}$$

In other words, the secondary-transfer outer roller velocity V(α) at any toner density α is expressed as:

$$V(\alpha)=V1-(S(\alpha)/\Delta S(\alpha)\times\Delta V) \quad \text{Eq. 5}$$

When the interval between the scale images printed on the sheet is long, that is, when the sheet velocity is higher than the velocity of the intermediate transfer belt, the scale images are transferred at an extended size, and as a consequence, the sub-scan magnification deviation S takes a positive value. In contrast,
when the sheet velocity is lower than the velocity of the intermediate transfer belt, the scale images are transferred in a reduced size, and as a consequence, the sub-scan magnification deviation S takes a negative value.

Thus, the target secondary-transfer outer roller velocity is determined according to each toner coverage. The above operation is performed on the first side, and the target velocity of the secondary-transfer outer roller in transferring the first side of the image is determined. The distribution of the target velocity of the secondary-transfer outer roller for the toner coverage on the first side is referred to as a first side velocity profile fs(c), where c is the function of the coverage.

For the second side, the scale images in the test chart are read by an internal or external reading unit, as for the first side. For the second side, the proportion of contact between the secondary-transfer outer roller and the sheet/toner changes according to the coverage of the toner image formed on the first side, and as a consequence, the efficiency of drive transmission to the sheet changes. For this reason, a second-side velocity profile fr(c) is the first side velocity profile fs(c) minus the effect of the first side toner coverage in image forming on the second side.

A first-side coverage effect profile f's(c) is expressed as:

$$f's(c)=f'r(c)-fs(c) \quad \text{Eq. 6}$$

where f'r(c) is the velocity profile obtained from the image formed on the second side.

Therefore, the velocity profile fr(c) of the second side is expressed as:

$$fr(cs)=fs(cs)-f's(cr) \quad \text{Eq. 7}$$

where cs is the coverage of the intermediate transfer belt side (the second side), and cr is the coverage of the secondary-transfer outer roller side (the first side at image formation of the second side).

Figure 7:
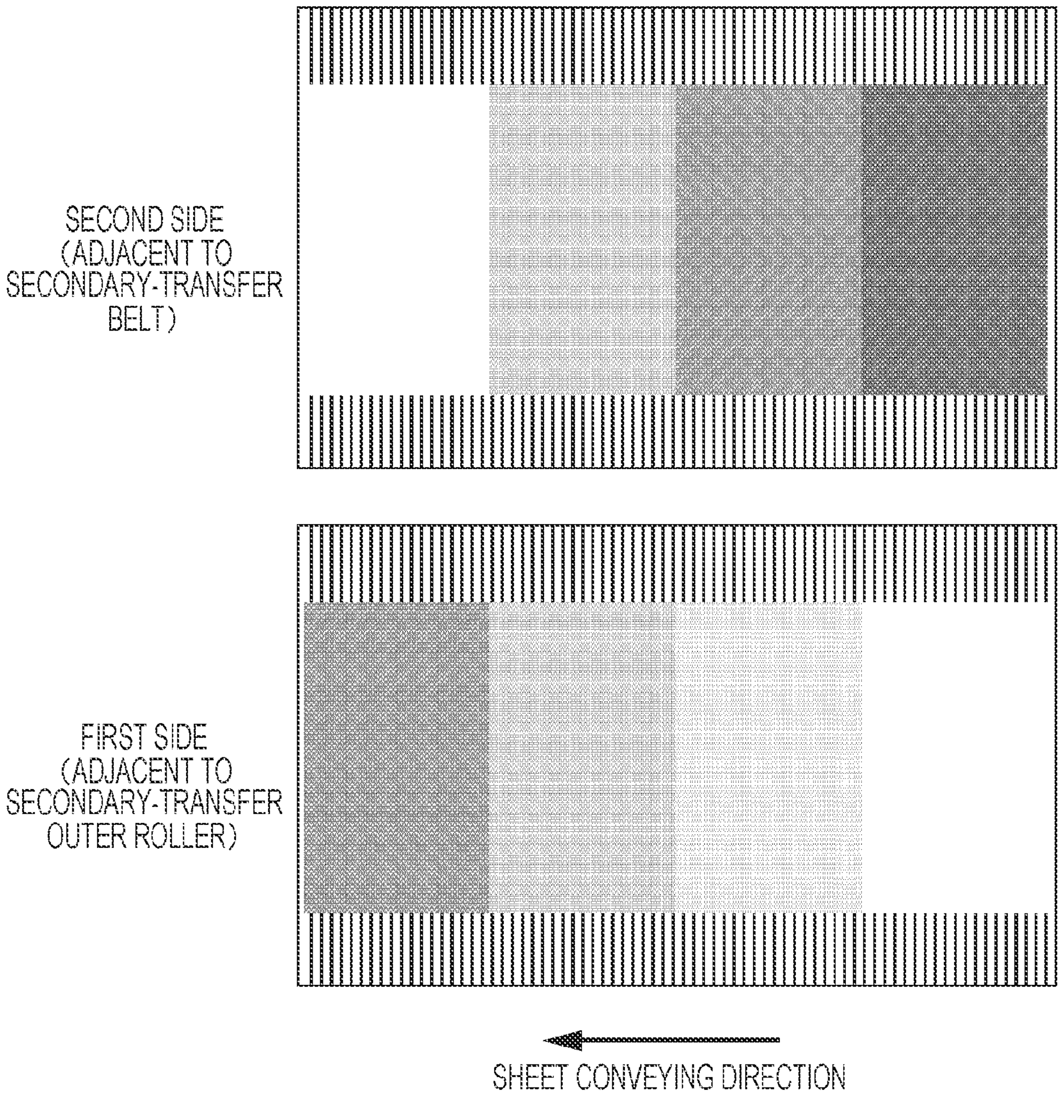
FIG. 7 is a schematic diagram of the front and the back of a test chart.

In this example, the same image is passed on the first side and the second side, as shown in FIG. 7. If there is no image on the secondary-transfer outer roller side, the velocity profiles of the first side and the second side are assumed to be the same, and the difference between different velocity profiles is regarded as the effect of the coverage on the secondary-transfer outer roller side. For this reason, passing the same image on the first side and the second side is easy and convenient in operation. Since the first-side sheet comes reversed, the portion of the large toner coverage is the leading end of the sheet on the secondary-transfer outer roller side in the image formation of the second side. Accordingly, in the operation for calculating the velocity profile, the coverage changes from 200%→100%→50%→0% in the conveying direction, while the coverage of the second side image changes from 0%→50%→100%→200%.

In this example of the test chart, the coverage of the first side image corresponding to the 50% coverage portion of the second side is 100%. Therefore, the target velocity of the secondary-transfer outer roller for the 50% coverage portion of the second side is expressed as:

$$fr(50)=fs(50)-f's(100) \quad \text{Eq. 8}$$

The above example illustrates a method of using the reading unit of the image forming apparatus. As an alternative, scale images may be calculated from an external reading unit and the deviation of the scale images may be input via the operating unit of the image forming apparatus. As a further alternative, scale images may be automatically read using a reading unit provided in a conveying path of the image forming apparatus main body.

Figure 8:
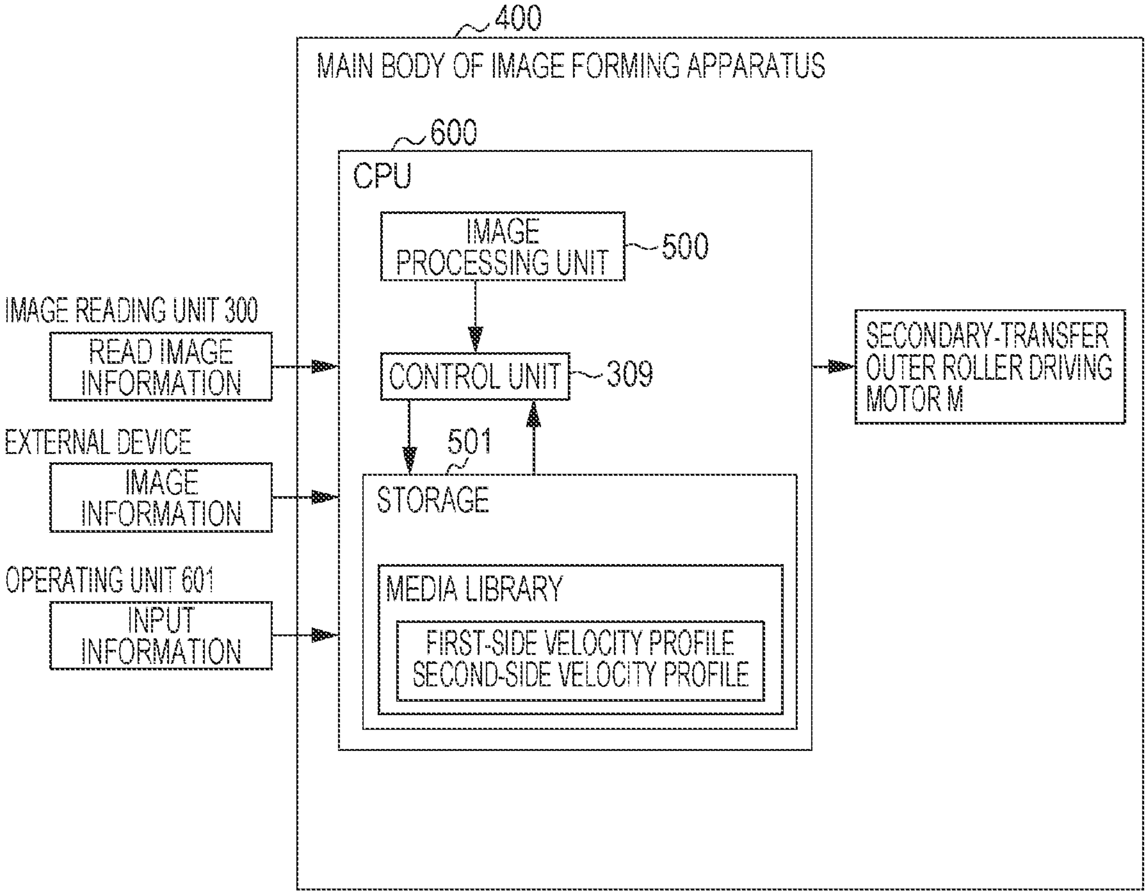
FIG. 8 is a control block diagram of the image forming apparatus.

Next, the control block diagram of the image forming apparatus 1000 will be described with reference to FIG. 8. The control unit 309 receives a toner coverage distribution in the conveying direction from the image processing unit 500. The control unit 309 controls the rotation velocity of the drive source M of the secondary-transfer outer roller with reference to the first side velocity profile and the second side velocity profile in the media library information stored in the storage 501, the conveyance timing, and sheet coverage information.

The operating unit 601 is a user interface (UI) (an input unit, a display unit) that transmits and receives electrical information to/from the CPU 600. The operating unit 601 is used to input setting and instruction for an image forming mode from the user (operator) to the CPU 600. The CPU 600 gives status information on the image forming apparatus 1000 for the user to the operating unit 601. The CPU 600 controls all of the mechanical components of the image forming apparatus 1000 as a whole.

The user selects a sheet and a sheet feeding stage to be used via the operating unit 601, and the control unit 309 uses a velocity profile associated with the selected sheet in the media library of the storage 501 according to the selected media information. The velocity profile has initial value settings for the sheet to be used for the first time. This is a general profile predicted from the information on the sheet, such as a basis weight and surface characteristics. Creating a profile for the sheet to be actually used is needed in reducing a sub-scan magnification change.

Therefore, the image forming apparatus 1000 is capable of overwriting velocity profile information in the media library for the sheet selected by the user with the obtained velocity profile. This allows a velocity profile associated with the sheet grade to be stored and allows for correction of the difference among the components, such as the diameters of the secondary transfer rollers, enabling a sub-scan magnification change to be prevented with higher accuracy.

Figure 9:
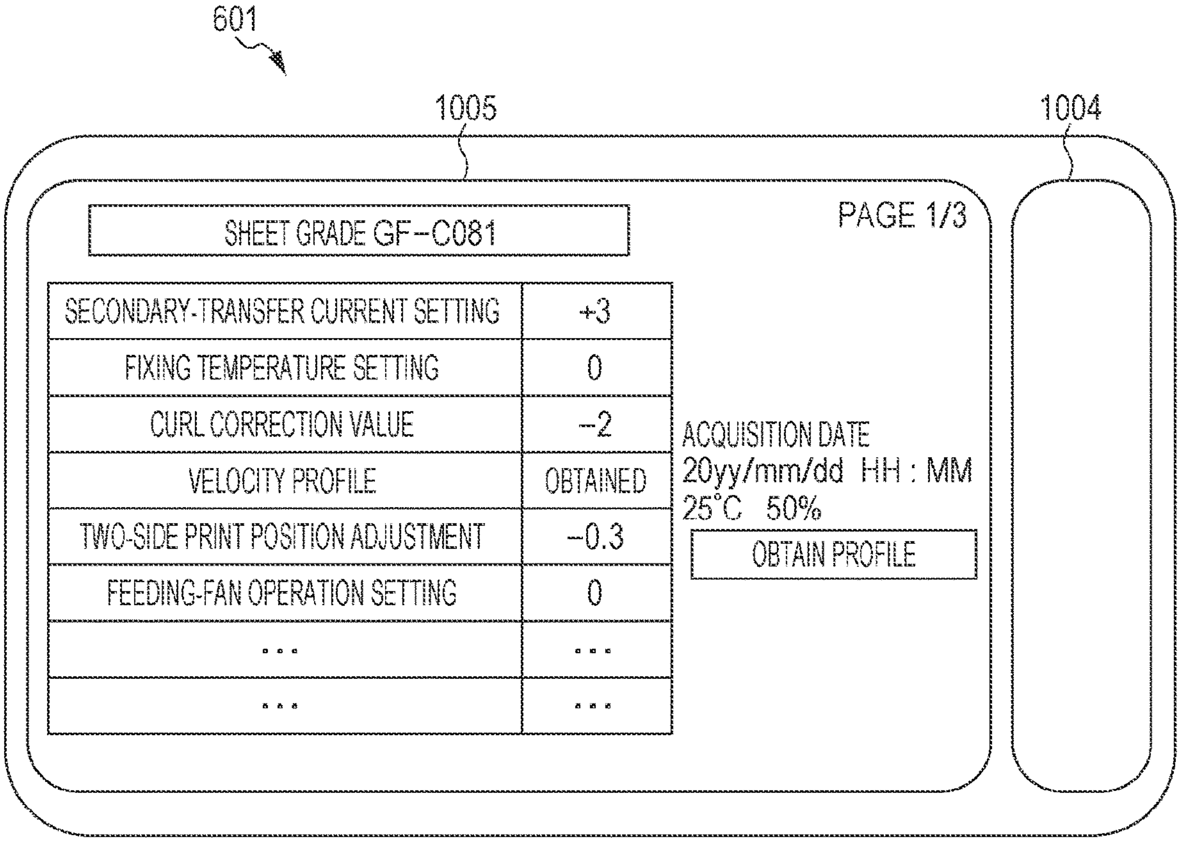
FIG. 9 is a diagram illustrating a screen example displayed on an operating unit.

FIG. 9 illustrates an example of a screen displayed on the operating unit 601 for confirming that the media library stores velocity profile information. The operating unit 601 includes an input portion (an operation panel) 1004 and a display (a user interface (UI) screen) 1005. The input portion 1004 includes various operation keys, such as a numeric keypad group for numerical input, a print start button, a stop key, and a power save button (not shown). The display 1005 is a touch panel liquid crystal screen on which various kinds of information, such as selectable sheets, and various operation buttons are displayed. The displayed operation buttons allow various settings for the operation of the image forming apparatus 1000 to be input to the control unit 309.

As shown in FIG. 9, the display 1005 displays a velocity profile associated with the sheet grade stored together with the acquisition date and temperature and humidity information sent from a built-in sensor. The sub-scan magnification of the sheet is not a little affected by the temperature and humidity of the sheet and is also affected by the difference among the components, such as the outside diameter of the secondary-transfer outer roller, and for this reason, is stored to find such changes.

The image forming apparatus 1000 digitally processes image information in printing according to an input from an external processing unit or copying with the reading unit, and the image processing unit 500 notifies the control unit 309 of the processed image information as toner coverage distribution information on the sheet. The control unit 309 controls the secondary-transfer outer roller velocity in accordance with the toner coverage distribution information and the velocity profile information stored in the storage 501. The timing of velocity control of the secondary-transfer outer roller and the sheet position can be controlled by timing the sheet to the image with the registration portion 208 or using a conveyance sensor provided upstream from the secondary transfer portion.

For example, when a 100% coverage image is transferred on the first side, the secondary-transfer outer roller is operated at the target velocity obtained from fs(100). When the second side of the sheet has a 50% coverage image, the target secondary-transfer outer roller velocity is expressed as fr(50)=fs(50)−{f'r(100)−fs(100)}. As will be understood, the more coverage information in the sheet conveying direction, that is, the more the number of divisions in the conveying direction, the more detailed control for the secondary-transfer outer roller driving velocity can be performed, allowing more detailed partial magnification correction.

Figure 10:
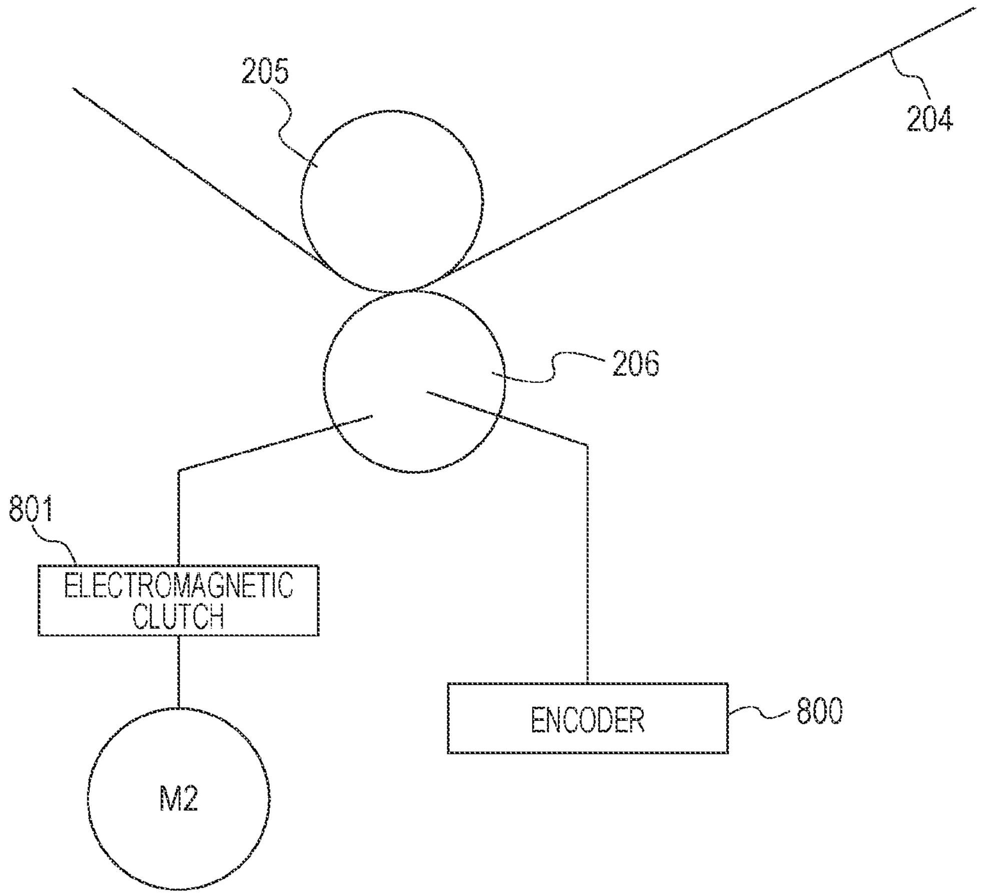
FIG. 10 is a schematic diagram of the drive configuration of a transfer portion.

The image forming apparatus 1000 described above changes the driving velocity of the secondary-transfer outer roller when obtaining the first side and second side velocity profiles. Alternatively, as shown in FIG. 10, driven rotation may be used by using a switching unit capable of switching the drive connection of the secondary-transfer outer roller. The deflection component of the secondary-transfer outer roller may be calculated and superimposed on the velocity profile by monitoring the rotation velocity of the secondary-transfer outer roller, which is a driven roller, with a rotary encoder.

Figure 11:
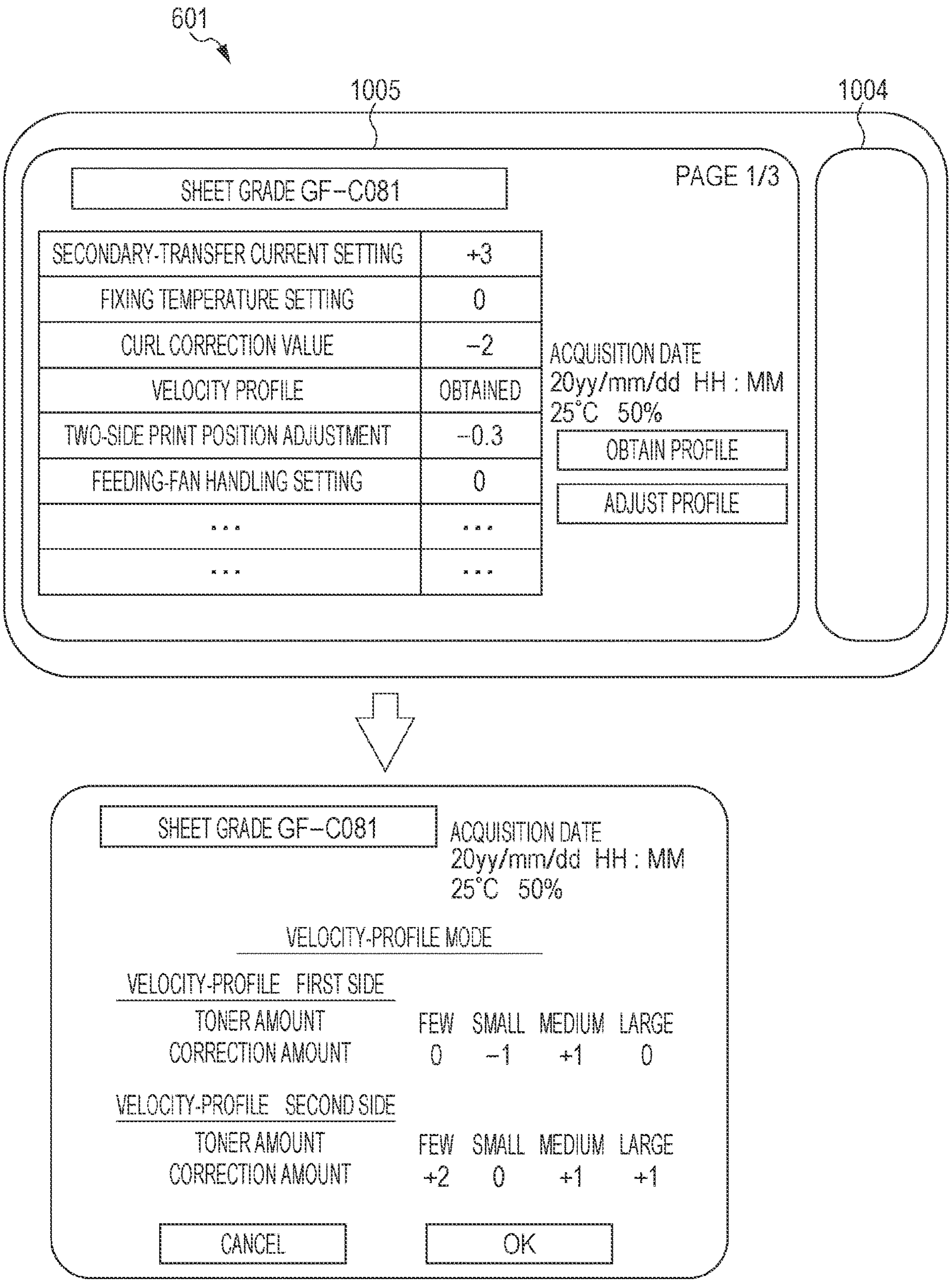
FIG. 11 is a diagram illustrating a screen example displayed on the operating unit.

If a sub-scan magnification change is still concerned even using the velocity profile stored in the media library, the user can manually adjust the velocity profile via the operating unit 601 as shown in FIG. 11.

The present invention can also be realized by one or more processors of a computer of a system or apparatus that reads out and executes programs for performing the functions of one or more of the above-described embodiments recorded on a storage medium or via network to perform the functions and/or one or more circuits (e.g., application specific integrated circuit (ASIC)) for performing the functions of one or more of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image forming apparatus comprising:
- an image forming unit configured to form a toner image on an image bearing member;
- an intermediate transfer belt to which the toner image formed on the image bearing member is transferred;
- a transfer member that is rotatable and is in contact with an outer surface of the intermediate transfer belt to form a transfer portion with the intermediate transfer belt, wherein transfer member is configured to transfer the toner image on the intermediate transfer belt to a recording medium at the transfer portion;
- a driving source for driving the transfer member;
- a control unit configured to control a rotation velocity of the transfer member; and
- a reading unit configured to read an image formed on the recording medium,
- wherein the control unit is capable of outputting a test chart on the recording medium, the test chart includes a plurality of test images transferred from the intermediate transfer belt, the plurality of test images includes a first test image of a first density and a second test image formed at a position different from a position of the first test image in a conveying direction of the recording medium, and the second test image has a second density different from the first density, and
- wherein the control unit is configured to control the rotation velocity of the transfer member at transfer based on a result of reading the test chart transferred to the recording medium with the reading unit.

2. The image forming apparatus according to claim 1, wherein the test chart further includes, in a width direction perpendicular to the conveying direction of the recording medium, a plurality of scale images formed alongside the plurality of test images in the conveying direction of the recording medium.

3. The image forming apparatus according to claim 1,
- wherein the test chart further includes a first test chart including first plural test images of different densities transferred to a first recording medium and a second test chart including second plural test images of different densities transferred to a second recording medium,
- wherein the control unit is configured to control the rotation velocity of the transfer member at transfer based on a result of reading the first test chart and the second test chart with the reading unit, and
- wherein the control unit controls the rotation velocity of the transfer member when the first recording medium passes through the transfer portion to a first velocity and controls the rotation velocity of the transfer member when the second recording medium passes through the transfer portion to a second velocity.

4. The image forming apparatus according to claim 1, wherein the control unit controls the rotation velocity of the transfer member at transfer based on image information formed on the recording medium passing through the transfer portion and a result of reading with the reading unit.

5. The image forming apparatus according to claim 1, wherein the transfer member comprises a transfer roller.

6. The image forming apparatus according to claim 1, wherein the control unit changes the rotation velocity of the transfer member while the recording medium is passing through the transfer portion based on image information formed on the recording medium passing through the transfer portion.

* * * * *